United States Patent [19]
Iatrides et al.

[11] Patent Number: 5,743,723
[45] Date of Patent: Apr. 28, 1998

[54] OXY-FUEL BURNER HAVING COAXIAL FUEL AND OXIDANT OUTLETS

[75] Inventors: Jean-Yves Iatrides, Saint Maur des Fossés, France; Harley Borders, Lombard; William Von Drasek, Oak Forest, both of Ill.

[73] Assignee: American Air Liquide, Inc., Houston, Tex.

[21] Appl. No.: 529,136

[22] Filed: Sep. 15, 1995

[51] Int. Cl.⁶ .................................................... F23M 3/04
[52] U.S. Cl. ............................ 431/8; 431/187; 431/12; 431/181
[58] Field of Search .................. 431/8, 9, 10, 12, 431/181, 186, 187, 188

[56] References Cited

U.S. PATENT DOCUMENTS

| | | | |
|---|---|---|---|
| 1,164,854 | 12/1915 | Oesterlen et al. | 431/188 |
| 1,175,629 | 3/1916 | Gerwig | 431/186 |
| 1,708,496 | 4/1929 | Clendon | 431/188 |
| 1,953,590 | 5/1934 | Cone | 431/187 X |
| 2,458,543 | 1/1949 | Urquhart | 431/10 |
| 4,642,047 | 2/1987 | Gitman | 431/10 |
| 4,797,087 | 1/1989 | Gitman | 431/187 |
| 4,933,163 | 6/1990 | Fischer et al. | 431/10 X |
| 4,986,748 | 1/1991 | Brown et al. | |
| 5,092,760 | 3/1992 | Brown et al. | 431/187 |
| 5,104,310 | 4/1992 | Saltin | |
| 5,199,866 | 4/1993 | Joshi et al. | |
| 5,256,058 | 10/1993 | Slavejkov et al. | |
| 5,267,850 | 12/1993 | Kobayashi et al. | |
| 5,454,712 | 10/1995 | Yap | 431/187 |
| 5,456,594 | 10/1995 | Yap | 431/1 |

Primary Examiner—Carl D. Price
Attorney, Agent, or Firm—Burns, Doane, Swecker and Mathis, L.L.P.

[57] ABSTRACT

An oxy-fuel burner according to the present invention includes an outer oxidant tube, an intermediate fuel tube and an inner oxidant tube which are coaxially arranged with the fuel tube disposed between the inner and outer oxidant tubes. Characteristics of the flame produced by the burner may be controlled by varying the relative flow rates of the inner and outer oxidant flows. An increase in the percentage of the total oxidant which is provided to the inner oxidant tube causes the length and luminosity of the flame to decrease and the flame momentum to increase. According to the present invention, the characteristics of a burner flame can be tailored to a particular application without requiring mechanical modification of the burner.

25 Claims, 6 Drawing Sheets

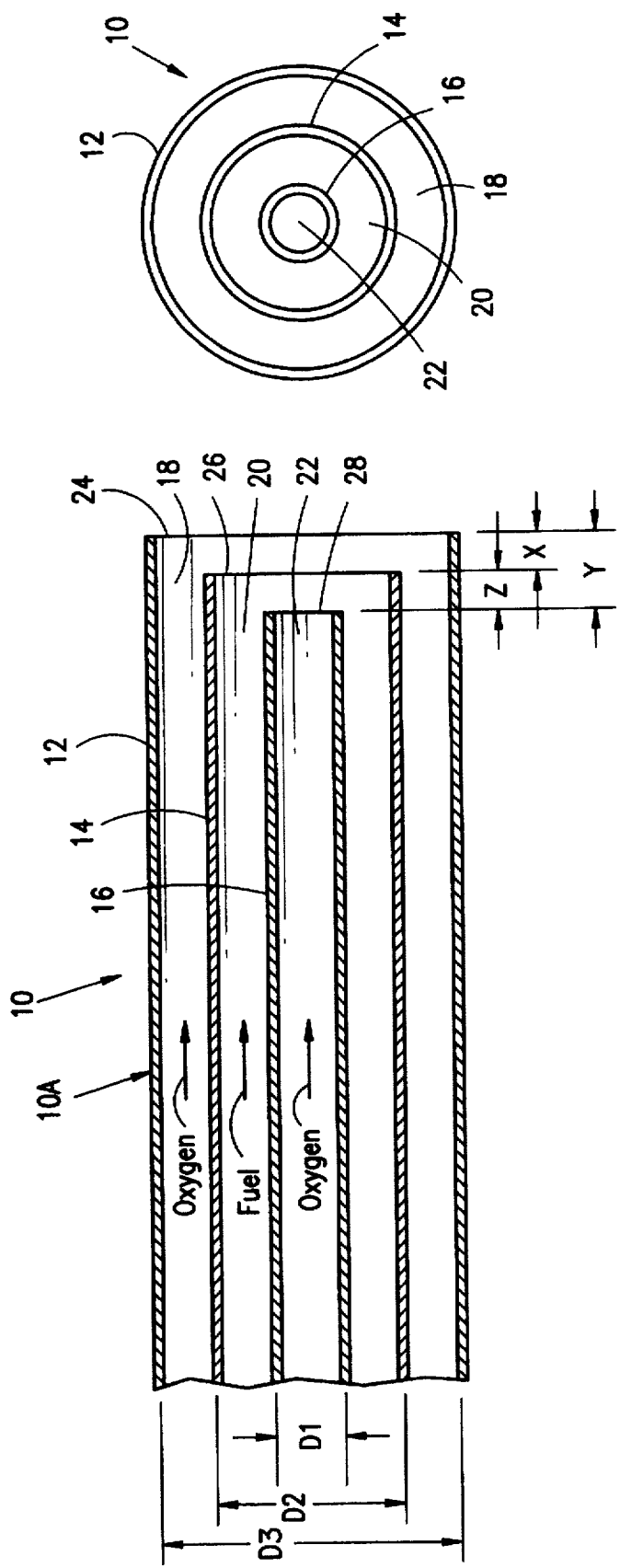

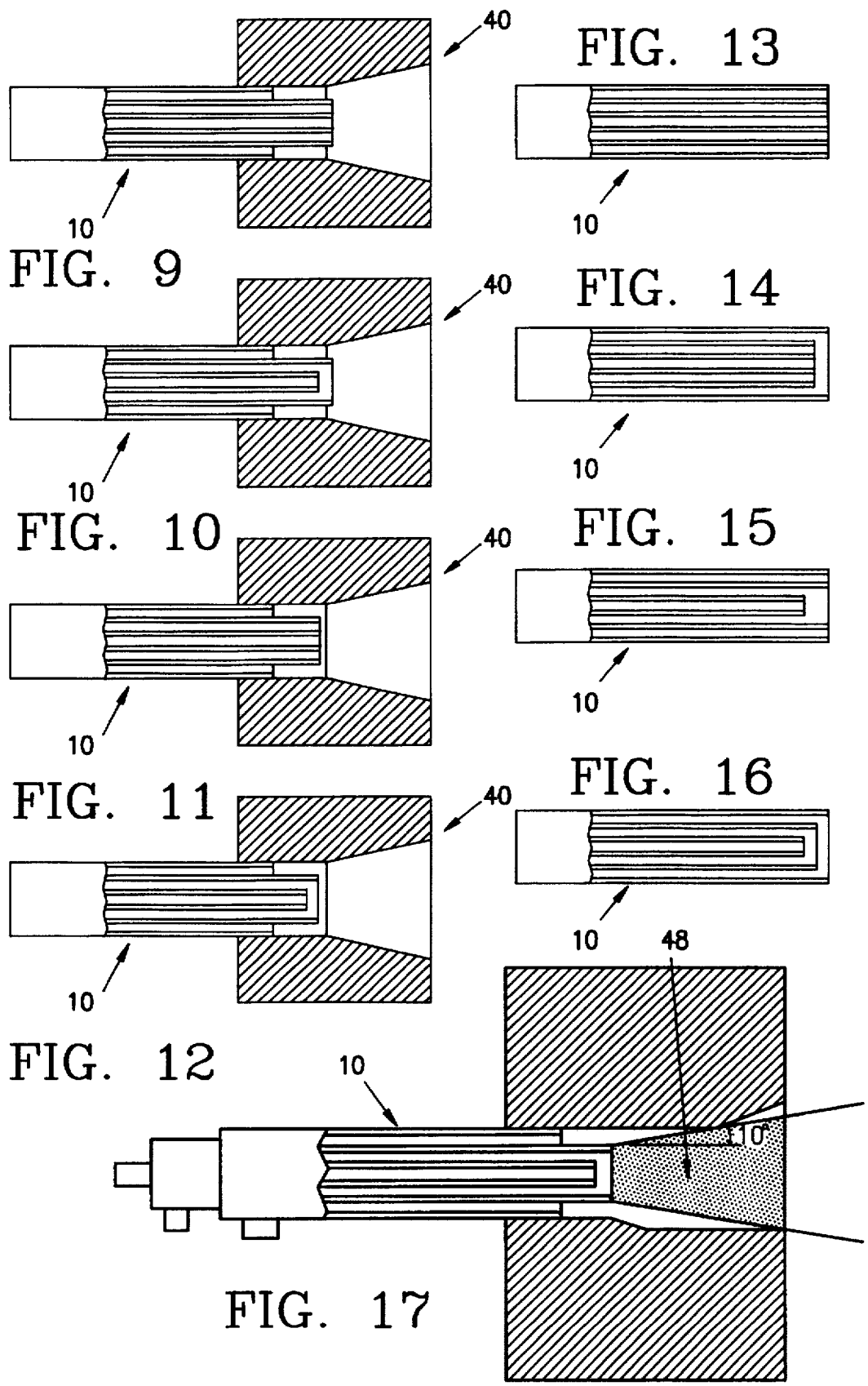

OXY-FUEL BURNER HAVING COAXIAL FUEL AND OXIDANT OUTLETS

BACKGROUND OF THE INVENTION

1. Field of the Invention

The present invention relates to an oxy-fuel burner in which coaxial passages supply fuel and oxygen.

2. Description of the Related Art

Oxy-fuel burners having coaxial passages for supply of fuel and oxygen, which are used for example, in glass melting furnaces, are disclosed in U.S. Pat. Nos. 4,986,748; 5,199,866; 5,256,058; and 5,267,850. In these burners the fuel, which may comprise natural gas, is fed through a passage arranged radially inside of a coaxial oxidant passage. Traditionally, the heat transfer profile of known burners is adjusted through modification of burner geometry which is relatively expensive and inconvenient. It would therefore, be desirable to be able to adjust the heat transfer profile in a more simple and convenient manner.

Known furnace configurations employ a plurality of burners each of which may operate at a different firing rate. If the same burner configuration is used for multiple burners throughout the furnace and these burners operate at different firing rates, the flame lengths of the burners will differ depending on the firing rates. Therefore, in furnaces employing known burners, where a relatively constant flame length is desired from one burner to the next, it may be necessary to modify the burner configurations of different burners within the furnace to achieve appropriate flame lengths when the burners are operated at different firing rates. This is a situation in which it would be particularly desirable to be able to adjust the flame length of each individual burner without mechanical modification of the burners.

In addition, it may be desirable in certain applications to employ burners in one area of a furnace that produce flames having a certain momentum while at the same time employing burners in a different area of the furnace that produce flames having a different momentum. However, these different flame momentums cannot be obtained for the same amount of fuel with the known burners without mechanically changing the burner configuration.

When due to operational reasons, the composition of the fuel used to fire the burners changes, (for instance, when propane replaces natural gas as the fuel during natural gas curtailment periods), a variable momentum burner can be found useful to maintain the original flame characteristics when the fuel density and flow rate changes significantly.

Another type of burner including a central oxygen nozzle, a fuel nozzle radially spaced from the central nozzel, and at least on peripheral oxygen nozzle is disclosed in U.S. Pat. No. 5,104,310. The peripheral oxygen nozzles provide a high velocity, preferably sonic oxidant flow. This sonic outer oxidant flow creates a high momentum flame which has several disadvantages over lower momentum flames. In particular, high momentum flames have shorter flame lengths and high flame peak temperatures, and they also produce more carry-over and more undesirable particulate matter emissions. The burner disclosed in U.S. Pat. No. 5,104,310 also has a drawback in that it employs a water jacket positioned around the exterior of the burner. In known water cooled burners there is a problem with condensation of various furnace gases on the cooled surfaces which causes corrosion of the surfaces. These corroded surfaces are subject to failure. Therefore, the use of a burner which does not require water cooling will advantageously avoid surface corrosion and failure. The burner disclosed in the above described patent has the additional drawback in that the characteristics of the flame cannot be changed without mechanical modification of the burner.

SUMMARY OF THE INVENTION

The present invention relates to an oxy-fuel burner comprising an outer oxidant-conducting passage forming an outer oxidant outlet, an inner oxidant-conducting passage forming an inner oxidant outlet, and a fuel-conducting passage forming a fuel outlet. The outlets are coaxially arranged, with the fuel outlet disposed radially between the outer and inner oxidant outlets.

The fuel outlet and the inner oxidant outlet are preferably positioned to cause fuel from the fuel-conducting passage to be mixed with oxidant from the inner oxidant-conducting passage at a location offset axially inwardly of the outer oxidant outlet. The flow rate of the oxidant through the inner oxidant-conducting passage is varied to control a characteristic of the flame, such as the momentum and/or the luminosity of the flame.

The burner preferably comprises outer, intermediate, and inner cylindrical tubes arranged coaxially. The outer cylindrical tube forms the outer oxidant-conducting passage. The outer cylindrical tube may be mounted in a cavity placed in the furnace wall, such as a burner block, that extends the outer cylindrical tube. In this case, the outer oxidant outlet is at the end of the cavity. When the burner is used without burner block, the outer oxidant outlet is the outer cylindrical tube outlet. The intermediate cylindrical tube is spaced radially inwardly from the outer tube and forms the fuel-conducting passage and the fuel outlet. The inner tube is spaced radially inwardly from the intermediate tube and forms the inner oxidant-conducting passage and the inner oxidant outlet. Preferably, the fuel outlet is offset axially inwardly with respect to the outer oxidant outlet, and the inner oxidant outlet is offset axially inwardly with respect to the fuel outlet.

The present invention also relates to a method of combining oxidant and a fuel in an oxy-fuel burner. The method comprises conducting an outer oxidant flow through an outer oxidant-conducting passage, and discharging the outer oxidant flow through an outer oxidant outlet. A fuel flow is conducted through a fuel-conducting passage and is discharged through a fuel outlet arranged coaxially with respect to the outer oxidant outlet and spaced radially inwardly therefrom. An inner oxidant flow is conducted through an inner oxidant-conducting passage and is discharged through an inner oxidant outlet arranged coaxially with respect to the fuel outlet and spaced radially inwardly therefrom.

The fuel flow is preferably mixed with the inner oxidant flow before being mixed with the outer oxidant flow.

Each of the outer and inner oxidant flows preferably contains at least 80% oxygen, with no more than about 50% of the total oxidant being supplied by the inner oxidant flow. The inner oxidant flow preferably has a discharge velocity of a magnitude no less than that of the outer oxidant flow. The discharge velocity of the outer oxidant flow is preferably in the range of from about 10 to 200 meters per second. The fuel flow preferably comprises natural gas having a discharge velocity in the range of from 20 to 80 meters per second.

BRIEF DESCRIPTION OF THE DRAWING FIGURES

The objects and advantages of the invention will become apparent from the following detailed description of preferred embodiments thereof in connection with the accompanying drawings in which like numerals designate like elements and in which:

FIG. 1 is a longitudinal sectional view taken through a burner according to the present invention;

FIG. 2 is an end view of the discharge end of the burner;

FIG. 9 is a side sectional view of a first embodiment of a burner according to the present invention which is mounted in a burner block;

FIG. 10 is a side sectional view of a second embodiment of a burner according to the present invention which is mounted in a burner block;

FIG. 11 is a side sectional view of a third embodiment of a burner according to the present invention which is mounted in a burner block;

FIG. 12 is a side sectional view of a forth embodiment of a burner according to the present invention which is mounted in a burner block;

FIG. 13 is a side sectional view of a fifth embodiment of the burner of the present invention without a burner block;

FIG. 14 is a side sectional view of a sixth embodiment of the burner of the present invention without a burner block;

FIG. 15 is a side sectional view of a seventh embodiment of the burner of the present invention without a burner block;

FIG. 16 is a side sectional view of a eighth embodiment of the burner of the present invention without a burner block;

FIG. 17 is a longitudinal sectional view through a burner block in which the burner is mounted, illustrating the flame zone;

DETAILED DESCRIPTION OF THE PREFERRED EMBODIMENTS

Figure 3:
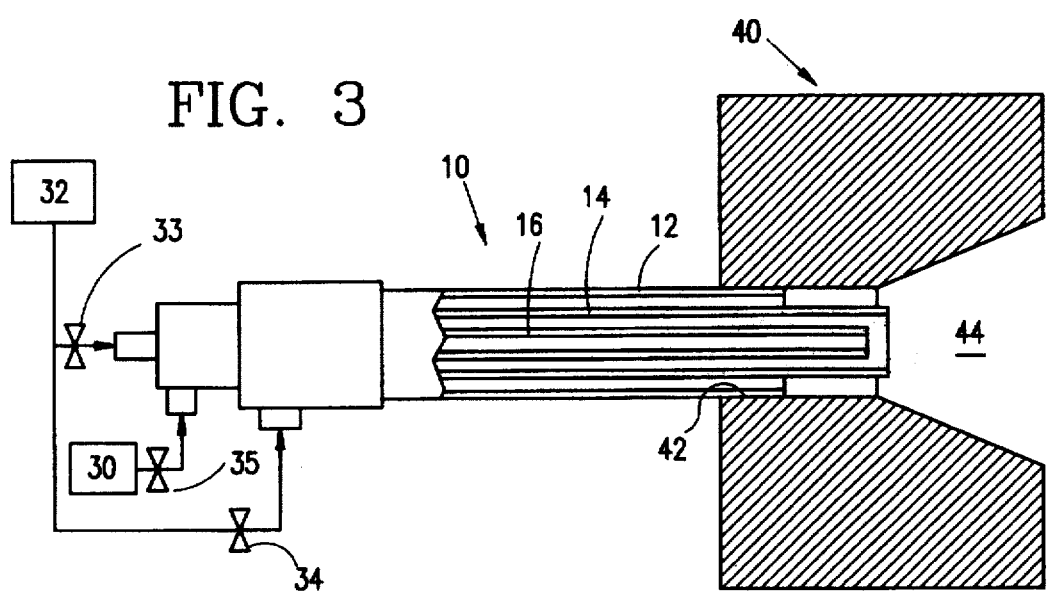
FIG. 3 is a longitudinal sectional view through a burner block in which a burner according to the present invention is mounted.
Figure 4:
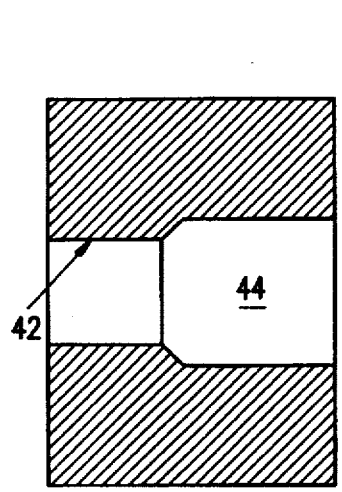
FIG. 4 is a side sectional view of a first alternative embodiment of a burner block which is substantially cylindrical.
Figure 5:
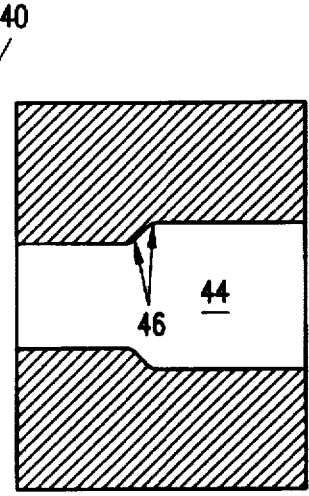
FIG. 5 is a side sectional view of a second alternative embodiment of a burner block which is substantially cylindrical.

Depicted in FIGS. 1 and 2 is the outlet portion 10A of an oxy-fuel burner 10. The outlet portion comprises three coaxial tubes 12, 14, 16. An outer passage 18, formed between outer 12 and intermediate 14 ones of the tubes, conducts an oxidant. An intermediate passage 20, formed between the intermediate tube 14 and a central tube 16, conducts fuel. An axial passage 22, defined by the central tube 16, conducts oxidant. Accordingly, it will be appreciated that a fuel passage 20 is situated between an inner oxidant passage 22 and an outer oxidant passage 18. The oxidant flows are discharged through outlets 24 and 28 of the tubes 12 and 16, and the fuel flow is discharged through the outlet 26 of the tube 14. Those outlets 24, 26, 28 are coaxially arranged.

When using the burner 10 according to the present invention, no more than about 50% of the total oxidant should be supplied by the inner oxidant passage 22. The oxidant velocities through the outlets 24, 28 can vary, and the oxidant velocity through the inner oxidant outlet 28 should be equal to or higher than that occurring at the outer oxidant outlet 24. The total oxidant flow through the inner and outer oxidant passages is determined by the amount of fuel to be burned. The oxidant velocity through the outer outlet 24 should be in the range of about 10 to 50 m/s, and the oxidant velocity through the inner oxidant outlet 28 should be in the range of about 10 to 200 m/s. The fuel velocity through the fuel outlet 26 should be in the range of from about 20 to 80 m/s.

The oxidant is preferably of the type containing at least 80% oxygen, and the fuel is preferably natural gas. Fuel and oxidant are supplied from a fuel source 30 and an oxidant source 32 by a control system as illustrated in FIG. 3. The velocity of the oxidant delivered to the inner oxidant passage 22 and the outer oxidant passage 18 is controlled by the valves 33, 35, respectively. Thus, for example, by increasing the amount of oxidant delivered to the inner oxidant passage 22 through suitable opening of the valve 33, the velocity of oxidant in the inner oxidant passage 22 can be increased. An additional valve 35 may also be provided to control the flow of the natural gas to the fuel passage 20. The valves 33,34,35 may be needle valves or any other suitable types of valves. The control system shown in FIG. 3 is merely an example of one control system which may be employed to vary the flow rates of the oxidant and fuel. Other suitable control systems may also be used without departing from the invention.

FIG. 3 also depicts the burner 10 mounted within a burner block 40 which is preferably made of ceramic material. In the present invention, the outer oxidant flow passes along the inner surface of the ceramic burner block. This is highly advantageous in that it provides convective cooling of the burner block so that the need for water cooling of the burner or burner block is eliminated.

The above-described burner 10 configuration enables various characteristics of the flame to be effectively controlled by changing the relative flow rates of the fuel and oxidant flows by the control system shown in FIG. 3. For example, by decreasing the inner oxidant flow, the length and luminosity of the flame can be increased, and the flame momentum can be decreased without any mechanical modification of the burner.

Variations of the productivity of a furnace can be accomplished by increasing or decreasing the firing rates of the burners in the furnace. Since the length of a flame produced by a conventional burner increases with the increase of the burner firing rate, the flames may become too long for a given furnace and impinge on the opposite wall, or become too short and provide insufficient coverage or heating of the load. With the burner of the present invention, one can adjust the flame length by varying the inner oxidant flow with respect to the outer oxidant flow in order to have an optimized coverage even when the furnace production varies. An important advantage of providing adjustable flow rates is that it is possible to maintain an optimum flame length when varying the firing rate of the burner.

In addition to changing the flame length, the control of the relative flow rates can be used to change the luminosity of the flame. It is generally accepted that a more luminous flame yields a higher radiation transfer and thus has a better heating efficiency. A flame that contains soot is highly luminous because the carbon particles that are progressively oxidized in the flame are strong visible light emitters. Soot formation can be promoted by creating fuel rich regions in the flame. Luminosity of the flame can be increased in the present invention by decreasing the inner oxidant flow which creates less mixing and more fuel rich regions in the flame for soot formation.

In addition, changing the relative flow rates effects a change of momentum of the flame. Low momentum flames are generally luminous, because the mixing between the oxidant and the fuel is bad, and there are fuel rich regions in the flame. On the other hand, high momentum flames are not visible. High momentum flames are shorter than low momentum flames, because the turbulence, and hence mixing, is higher. Low momentum flames are also colder than high momentum flames because it takes longer for the fuel molecules to meet with the oxygen molecules. By reducing the flame momentum, the high flame peak temperatures found in high momentum flames are thus avoided, and less nitrogen oxides ($NO_x$) are formed.

Low momentum flames have less impact on a pulverized load, and produce less carry-over, and eventually less particulate matter (PM) emissions. This is important for instance in glass furnaces. Low momentum flames are also more easily subject to flame deflections by other gaseous flows within a furnace. Deflections of the flame towards the crown for instance can lead to accelerated refractory wear.

When little or no oxidant is present in the inner oxidant tube 16, a long, lazy, and luminous flame is produced. The long flame is advantageous for some industrial users because of increased surface area that results in larger coverage of the bath. However, the resulting flame from low momentum operation can be sensitive to interactions with other flames or gaseous flows within the furnace. The effects of surrounding flames and/or flows can result in hot spots on the bath surface, instability in the overall flame shape, or crown and refractory damage.

The addition of oxidant injected in the inner oxidant tube 16 results in a shorter, more intense, higher momentum flame, especially at higher inner oxidant flow rates. Varying the proportion of injected oxidant between the outer and inner tubes varies the momentum. High flow rates of oxidant through the inner oxidant tube 16 increases the momentum resulting in a shorter stable luminous flame due to the increased mixing between fuel and oxidant.

Thus, the present invention allows the furnace operator to easily tailor the flame shape for a particular industrial application by adjusting the proportion of oxidant present in the center of the flame.

Characteristics of the flame can also be controlled by changing the relative axial and radial positions of the tubes 12,14,16 and by altering the position of the burner 10 in the burner block 40. For example, in FIG. 1, the outlet 26 of the intermediate tube 14 is shown as being spaced axially inwardly of the outlet 24 of the outer tube 12 by a distance X. Likewise, the outlet 28 of the axial tube 16 is shown as spaced axially inwardly of the outlet 26 of the intermediate tube by a distance Y. As a result of the relationship of the outlets, a pre-mixing of the inner oxidant flow and fuel flow is achieved before the fuel exits the tip of the burner. Hence, a portion of the fuel can react with the inner oxidant flow to produce soot and/or carbon for enhancing flame luminosity.

FIGS. 9–12 illustrate various preferred configurations of the burner 10 mounted in a burner block 40, and FIGS. 13–16 illustrate various preferred configurations of the burner 10 for use without a burner block. As shown in FIGS. 9–12, when the burner 10 is mounted in a burner block 40, the outer oxidant tube 12 is preferably shorter than the fuel tube 14, and the inner oxidant tube 16. The outer oxidant tube 12 is prolonged by the cylindrical opening in the burner block 40 so that the outer oxidant outlet 24 is formed by a portion of the burner block 40.

Thus, the outer oxidant passage can be defined by both an outer tube and the burner block. As shown in FIGS. 13–16, when the burner is not mounted in a burner block, the outer oxidant tube 12 is preferably equal to or longer than the fuel tube 14.

The axial extent of the intermediate fuel tube 14 can be aligned with the inner oxidant tube 16, as shown in FIGS. 9, 11, 13, and 14. However, the intermediate fuel tube 14 preferably extends outwardly from the inner oxidant tube 16, as shown in FIGS. 10, 12, 15, and 16. Configurations where the inner oxidant tube extends outward beyond the fuel tube are undesirable because they can lead to excessive heating of the inner oxidant tube due to mixing of the fuel and the outer oxidant.

The respective positions of the two inner tubes are preferably defined by the formula:

$$-D1 < Z < 3(D2-D1)$$

wherein D1 and D2 are the inner diameters of the central tube 16 and the intermediate tube 14, respectively, and Z is the axial distance from the fuel outlet 26 to the inner oxidant outlet 28. In the embodiment shown in FIG. 1, Z is negative. Therefore, according to the formula, the inner oxidant outlet 28 is preferably set back into the fuel tube a distance which is not greater than the diameter of the inner oxidant tube D1. This configuration defined by the formula prevents the excess combustion from occurring within the intermediate fuel tube 14 and thus, prevents combustion products of the reaction between the oxygen from the inner oxidant passage 22 and the fuel from impinging on the intermediate fuel tube 14.

Examples of burner blocks 40 for use with the burner of the present invention are shown in FIGS. 4–8. Each of the burner blocks 40 contains a cylindrical hole 42 on a back face thereof for insertion of the burner 10. The walls defining the cylindrical hole 42 form an extension of the outer oxidant tube 12 and the cylindrical hole constitutes a part of the outer oxidant passage 18. The cylindrical hole 42 opens into a burner block cavity 44 or combustion chamber with an inner geometry which may take the form of any one of the shapes which are shown in FIGS. 4–8, i.e., conical, cylindrical, gradually stepped or other known shapes. In preferred embodiments of the burner blocks 40, such as those shown in FIGS. 5 and 8, there is a smooth transition surface 46 between the cylindrical hole 42 and the cavity 44 in order to reduce the effect of the walls on the outer oxygen flow.

In addition, the cavity 44 of the burner block 40 should be formed, as shown in FIG. 17, so that it does not interfere with the flame zone 48. The flame zone 48 includes the area which extends in a conical manner at approximately 10° from the outlet 26 of the intermediate fuel tube 14. FIG. 17 illustrates burner blocks 40 of two different configurations, including a conical type burner block which is illustrated in the upper portion of the figure and a cylindrical type burner block which is shown in the lower portion of the figure. The walls of the burner blocks, shown in FIG. 17, do not interfere with the flame zone 46.

Figure 6:
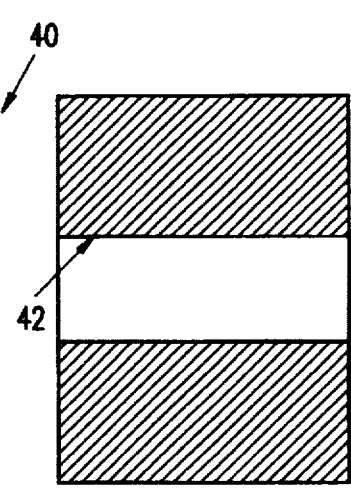
FIG. 6 is a side sectional view of a third alternative embodiment of a burner block which is substantially cylindrical.
Figure 7:
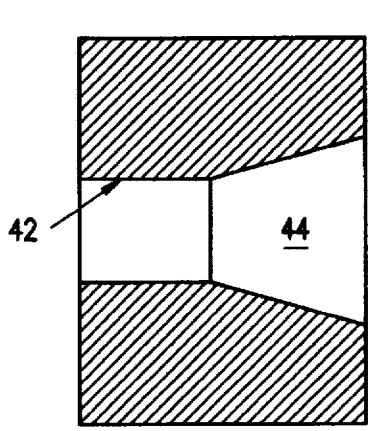
FIG. 7 is a side sectional view of a fourth alternative embodiment of a burner block which is substantially conical.
Figure 8:
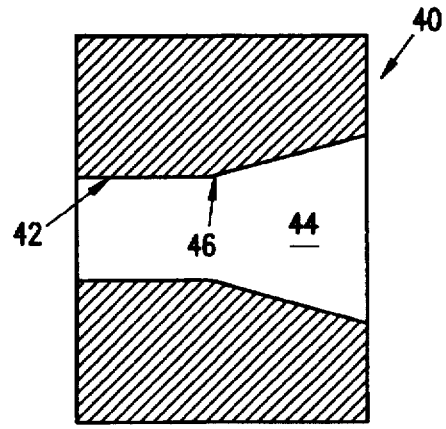
FIG. 8 is a side sectional view of a fifth alternative embodiment of a burner block which is substantially conical.

In one experiment made with the burner depicted in FIGS. 1 and 2 utilizing a 50 kw burner, the following parameters were used:

natural gas discharge velocity—45.7 m/s outer oxidant discharge velocity—10 to 15 m/s inner oxidant discharge velocity—0 to 58 m/s distance X=0.5 in distance Y=1 in When the burner was arranged to discharge the flame into a burner block 40 having cylindrical or conical burner cavities, as shown in FIGS. 6 and 7, respectively, it was found that the flame luminosity was enhanced by decreased inner oxidant flows. Also, when the inner oxidant flow was increased, the flame length and luminosity decreased.

When no burner block was used, it was found that by increasing the inner oxidant flow, the flame had a greater momentum. Also, when the inner oxidant outlet 28 was offset axially rearwardly from the fuel outlet 26, and the fuel outlet was offset axially rearwardly from the outer oxidant outlet 24, as shown in FIG. 1, the luminosity of the flame increased.

Further experiments were conducted employing three burners (burner 1, burner 2, and burner 3) in which the inner and outer diameters of the inner oxidant tube 16, the fuel tube 14, and the outer oxidant tube 12 are given in mm in Table 1. As shown in Tables 2–6, the flame length was generally decreased by increasing the percentage and velocity of the oxidant passing through the inner oxidant passage 22. The velocities in Tables 2–6 are in meters per second.

TABLE 1

| mm | $D_{1in}$ | $D_{1out}$ | $D_{2in}$ | $D_{2out}$ | $D_{3in}$ |
|---|---|---|---|---|---|
| burner 1 | 7.0 | 9.9 | 20.6 | 25.4 | 60.1 |
| burner 2 | 10.9 | 12.7 | 27.9 | 34.0 | 60.1 |
| burner 3 | 13.2 | 16.2 | 34.3 | 37.3 | 70.0 |

TABLE 2

Burner 1: firing rate 280 kW

| % $O_2$ at center | $VO_{2in}$ | $V_{fuel}$ | $VO_{2out}$ | flame length (m) |
|---|---|---|---|---|
| 0% | 0.0 | 30.3 | 6.7 | 1.5 |
| 5% | 20.2 | 30.3 | 6.3 | 1.35 |
| 10% | 40.4 | 30.3 | 6.0 | 1.25 |
| 16% | 60.6 | 30.3 | 5.7 | 0.9 |

TABLE 3

Burner 1: firing rate 700 kW

| % $O_2$ at center | $VO_{2in}$ | $V_{fuel}$ | $VO_{2out}$ | flame length (m) |
|---|---|---|---|---|
| 0% | 0.0 | 75.9 | 16.7 | 1.8 |
| 1% | 13.1 | 75.9 | 16.5 | 1.7 |
| 3% | 26.3 | 75.9 | 16.3 | 1.7 |
| 7% | 65.7 | 75.9 | 15.6 | 1.5 |

TABLE 4

Burner 2: firing rate 280 kW

| % $O_2$ at center | $VO_{2in}$ | $V_{fuel}$ | $VO_{2out}$ | flame length (m) |
|---|---|---|---|---|
| 0% | 0.0 | 16.0 | 8.1 | 1.0 |
| 5% | 8.3 | 16.0 | 7.7 | 1.25 |
| 15% | 25.0 | 16.0 | 6.9 | 1.25 |

TABLE 5

Burner 2: firing rate 700 kW

| % $O_2$ at center | $VO_{2in}$ | $V_{fuel}$ | $VO_{2out}$ | flame length (m) |
|---|---|---|---|---|
| 0% | 0.0 | 40.1 | 20.2 | 1.8 |
| 3% | 13.3 | 40.1 | 19.5 | 1.8 |
| 7% | 27.1 | 40.1 | 18.9 | 1.35 |

TABLE 6

Burner 3: firing rate 1 MW

| % $O_2$ at center | $VO_{2in}$ | $V_{fuel}$ | $VO_{2out}$ | flame length (m) |
|---|---|---|---|---|
| 0.00% | 0.0 | 38.7 | 20.2 | 2.6 |
| 2.50% | 10.1 | 38.7 | 19.7 | 2.2 |
| 5.00% | 20.3 | 38.7 | 19.2 | 1.9 |
| 7.50% | 30.4 | 38.7 | 18.6 | 1.85 |
| 10.00% | 40.6 | 38.7 | 18.1 | 1.7 |
| 11.50% | 46.7 | 38.7 | 17.8 | 1.6 |
| 13.00% | 52.8 | 38.7 | 17.5 | 1.6 |
| 15.00% | 60.9 | 38.7 | 17.1 | 1.4 |
| 17.50% | 71.0 | 38.7 | 16.6 | 1.3 |

In addition, numerical simulations were conducted for an industrial 500 kW scale burner having the following dimensions.

| $D_{1in}$ | = | 11 mm; $D_{1out}$ | = | 13 mm |
| $D_{2in}$ | = | 26 mm; $D_{2out}$ | = | 33 mm |
| $D_{3in}$ | = | 55.9 mm | | |

Figure 18:
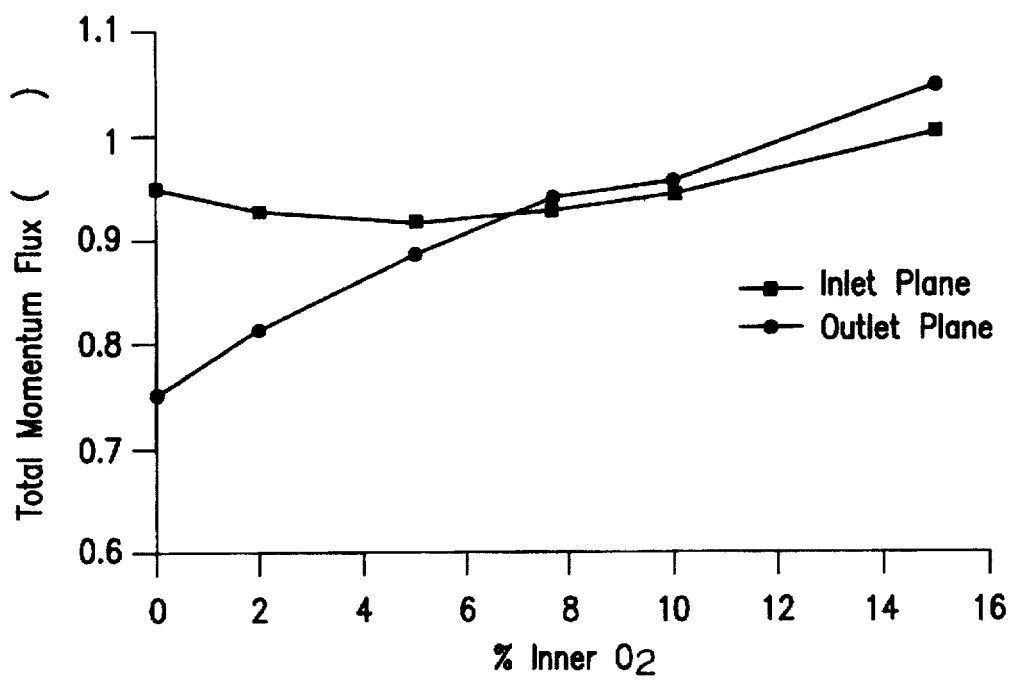
FIG. 18 is a graph of the total axial-direction momentum flux across the burner inlet and exit plane as predicted by numerical simulation.

The simulations are useful for explaining the experimentally observed trends in the visible flame length when $O_2$ is injected into the inner tube. For the model an axis symmetric geometry was used with a computational fluid dynamic (CFD) code to solve the equations governing heat, mass, and momentum. The calculations evaluated the effect of the momentum flux exiting the burner for different percentages of $O_2$ injected into the inner. The modeling results show that by increasing the inner $O_2$ from 0% to 15% increases the total momentum at the exit plane by 29%. These results are summarized in FIG. 18 which illustrates the total momentum flux across the burner inlet and exit planes.

The numerical calculation confirms the experimental observation that an increase in inner oxidant flow results in a higher flame momentum at the burner outlet. The agreement between experimental observations and numerical calculations is further confirmed by correlations found between measured profiles of hydroxyl radical (OH) emission in the flame and calculated OH concentrations in the flame, as described in the following.

An estimation of the OH concentration and spatial distribution at the burner exit can be made by using computational fluid dynamic (CFD) modeling. Knowledge of the temperature, pressure, and species concentration at the exit provides the necessary information for performing a thermodynamic equilibrium calculation. The results shown in FIG. 19 indicated that the location of the OH mole fraction peak shifts away from the center axis of the burner with the injection of inner $O_2$ and reaches a maximum shift with additional $O_2$ injection. Also, the inner OH peak decreases with additional $O_2$ injection as shown for the 15% case in FIG. 19 due to quenching by the large amount of $O_2$ present.

Figure 19:
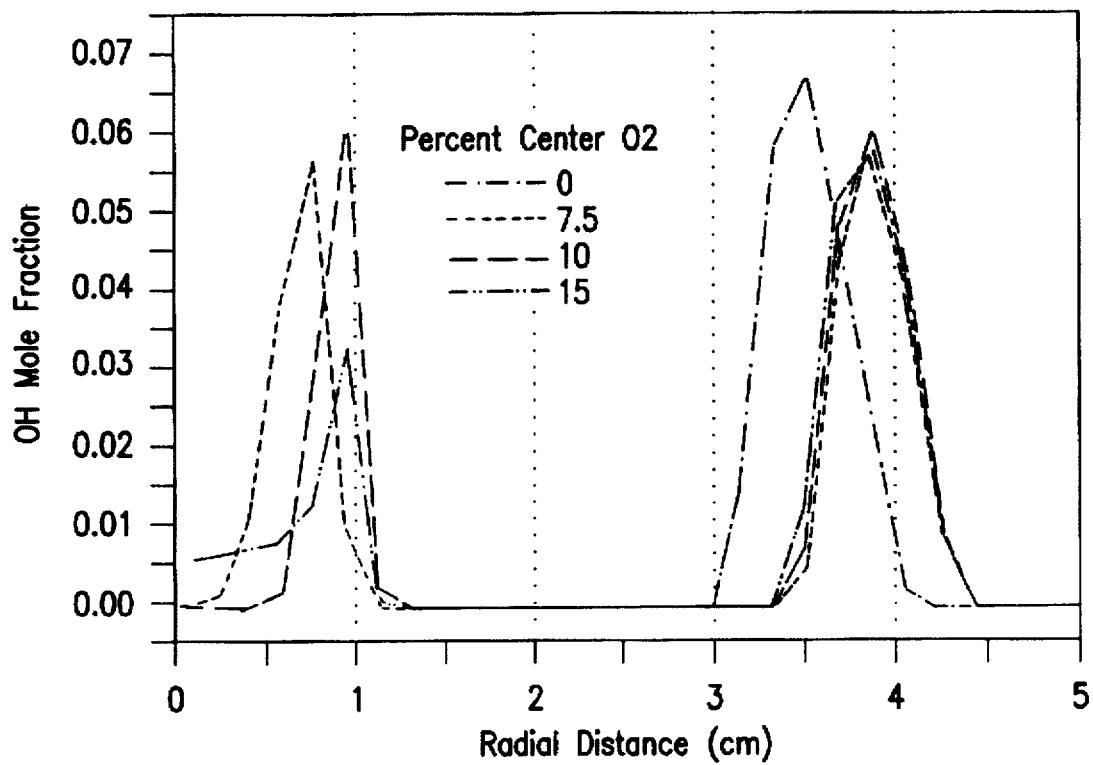
FIG. 19 is a graph which shows the predicted hydroxyl radical (OH) mole fraction from numerical simulation at the exit plane of the burner.
Figure 20:
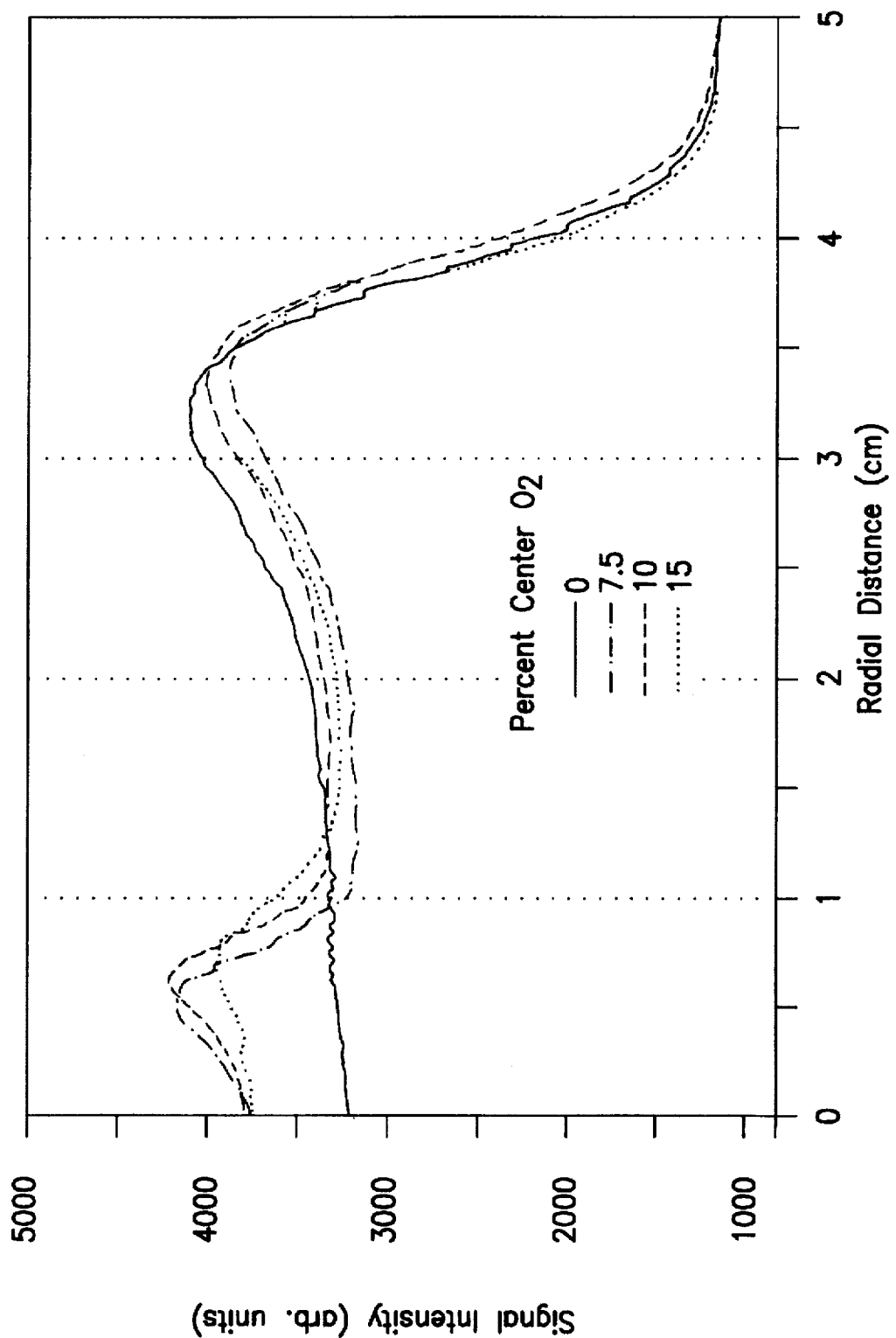
FIG. 20 is a graph which shows an integrated OH emission profile at the exit of the burner.

To verify the modeling results of FIG. 19 a comparison with measured OH profiles was made to see if the same qualitative features are observed. OH radical emission measurements are performed with an Ultra-Violet sensitive video camera equipped with a filter that allows only the light emitted by the OH radical to reach the detector. The experimental integrated OH profiles were obtained from a pilot furnace. The results shown in FIG. 20 do show the same qualitative features with the OH peaks shifting away from the center axis of the burner with injection of $O_2$ in the inner tube. Even the subtle displacement of the OH peak in the inner portion of the burner and the decrease in the peak for the 15% case are observed. However, the spatial location of the observed OH peak is not similar to the model which is probably due to the firing rates between the experiment and model differing by 30%. Nevertheless, the qualitative similarities between these results add some validity to the CFD modeling of the detailed fluid mechanic and thermal processes within the burner block.

Evaluation of the burner for $NO_x$ production was conducted in a pilot furnace using a conventional sampling technique. A water cooled suction probe was inserted in the flue channel of the pilot furnace to sample the combustion products. All chemical reactions within the probe are frozen due to the rapid quenching of the gases. The gas sample was filtered and dried out prior to analysis by specific analyzers. Measurements were made for varying $O_2$ flows injected in the inner oxidant tube 16. Though oxy-fuel combustion virtually eliminates $NO_x$ by essentially removing the source of $NO_x$ from the oxidant other sources such as, air leaks, fuel, and nonpure $O_2$ contribute to $NO_x$ formation. To investigate the effect, the presence of additional $N_2$ will have on $NO_x$ formation, $N_2$ was injected in either the fuel and/or the $O_2$.

Figure 21:
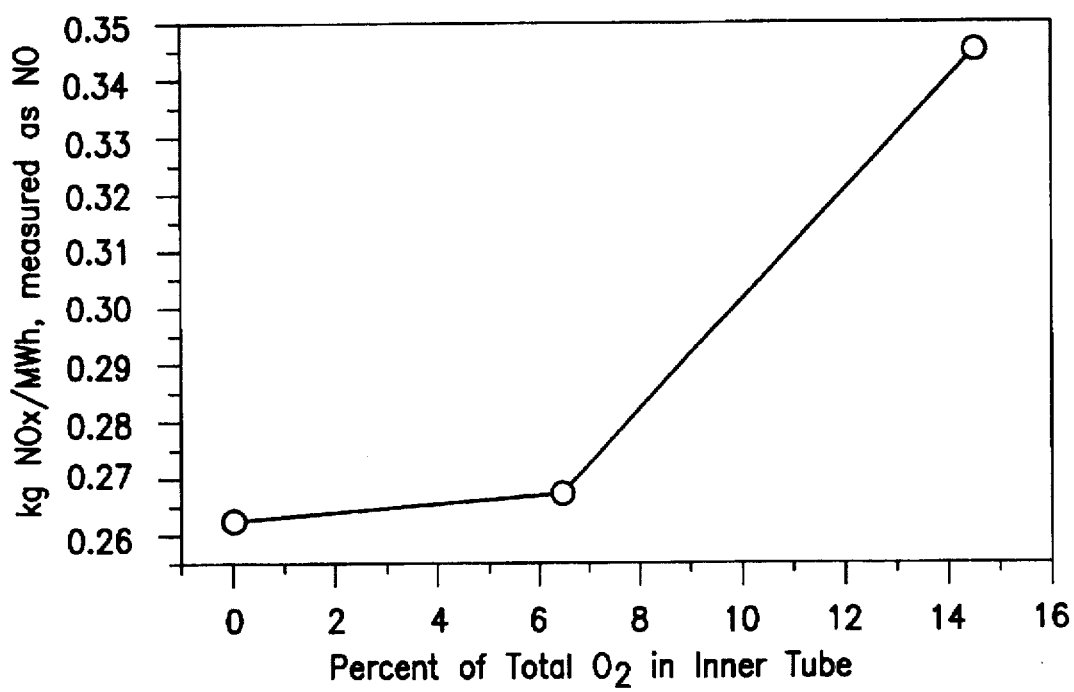
FIG. 21 is a graph which shows the $NO_x$ formation from a 0.32 MW burner.

FIG. 21 illustrates that $NO_x$ production increases as the proportion of $O_2$ injected in the inner tube increases. This result is not surprising since the modeling calculations indicate the temperature is also increasing thus leading to thermal $NO_x$ production. This is also evident in OH imaging experiments were the abundance of OH observed suggests a higher flame temperature with $O_2$ injected in the inner tube.

In addition to varying the flow rate of the inner oxidant flow, a solenoid valve may be used to produce an oscilating flow of oxidant through the inner oxidant passage 22. With the use of an oscillating flow, it may be possible to reduce $NO_x$ produced by the flame by up to 40%.

Figure 22:
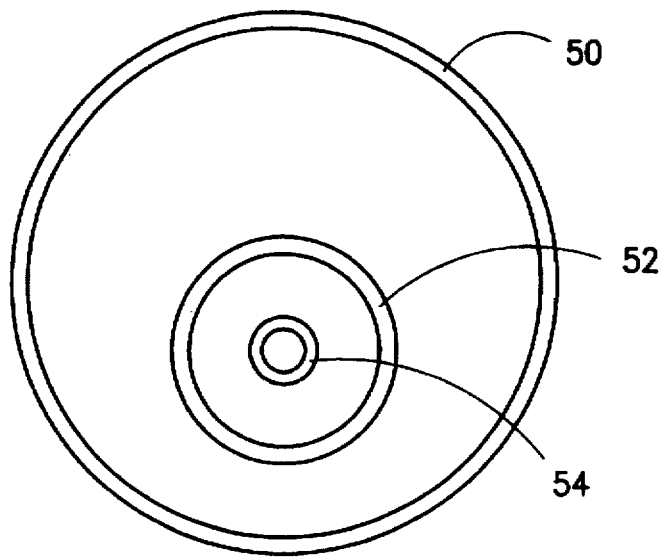
FIG. 22 is an end view of an alternative embodiment of the burner according to the present invention.

Additionally, fuel injection which is located off the axis of outer oxidant flow has been found to reduce $NO_x$ emissions. In the alternative embodiment of the burner shown in FIG. 22, the movement of the intermediate oxidant tube 52 and the inner oxidant tube 54 to a non-coaxial position within the outer oxidant tube 50 can provide an advantageous decrease in $NO_x$ over coaxial arrangements.

While the invention has been described in detail with reference to specific embodiments thereof, it will be apparent to one skilled in the art that various changes and modification can be made, and equivalents employed, without departing from the spirit and scope of the invention.

What is claimed is:

1. An oxy-fuel burner comprising an outer oxidant-conducting passage forming an outer oxidant outlet, an inner oxidant-conducting passage forming an inner oxidant outlet, oxidant source means for providing a source of oxidant comprising at least 80% oxygen, said oxidant source means being in fluid communication with said inner and outer oxidant-conducting passages, a fuel-conducting passage forming a fuel outlet, said outer oxidant outlet, said inner oxidant outlet, and said fuel outlet being coaxially arranged, with said fuel outlet disposed radially between said outer and inner oxidant outlets, and first valve means for varying a flow rate of oxidant through the inner oxidant-conducting passage to control a characteristic of the flame.

2. The oxy-fuel burner according to claim 1 wherein said fuel outlet and said inner oxidant outlet are positioned to cause fuel from said fuel-conducting passage to be mixed with oxidant from said inner oxidant-conducting passage at a location offset axially inwardly of said outer oxidant outlet.

3. The oxy-fuel burner according to claim 2 further comprising outer, intermediate, and inner cylindrical tubes arranged coaxially, said outer cylindrical tube forming said outer oxidant-conducting passage, said intermediate cylindrical tube spaced radially inwardly from said outer tube and forming said fuel-conducting passage and said fuel outlet, said inner tube spaced radially inwardly from said intermediate tube and forming said inner oxidant-conducting passage and said inner oxidant outlet.

4. The oxy-fuel burner according to claim 3 wherein said inner oxidant outlet is offset axially inwardly with respect to said fuel outlet.

5. The oxy-fuel burner according to claim 3 further including a burner block having a hole, said tubes arranged to discharge oxidant and fuel into said hole.

6. The oxy-fuel burner according to claim 5, wherein the hole of the burner block forms a part of the outer oxidant-conducting passage.

7. The oxy-fuel burner according to claim 5 wherein said hole is cylindrical.

8. The oxy-fuel burner according to claim 5 wherein said hole is conical.

9. The oxy-fuel burner according to claim 1 wherein said fuel outlet is offset axially inwardly with respect to said outer oxidant outlet.

10. The oxy-fuel burner according to claim 1 further including oxidant supply means for supplying oxidant to said outer and inner oxidant-conducting passages, and fuel supply means for supplying fuel to said fuel-conducting passage.

11. The oxy-fuel burner according to claim 1 wherein the characteristic of the flame which is controlled is the momentum of the flame.

12. The oxy-fuel burner according to claim 1 wherein the characteristic of the flame which is controlled is the luminosity of the flame.

13. The oxy-fuel burner according to claim 1 wherein the characteristic of the flame which is controlled is the flame length.

14. The oxy-fuel burner according to claim 1, wherein the outer oxidant-conducting passage and the inner oxidant-conducting passage are connected to the same oxidant source.

15. The oxy-fuel burner according to claim 1, further comprising:
    second valve means for controlling flow through the outer oxidant-conducting passage; and
    third valve means for controlling flow through the fuel-conducting passage.

16. A method of combining oxidant and fuel in an oxy-fuel burner to produce a flame, comprising:
    conducting an outer oxidant flow comprising at least 80% oxygen from an oxidant source through an outer oxidant-conducting passage, and discharging said outer oxidant flow through an outer oxidant outlet,
    conducting a fuel flow from an oxidant source through a fuel-conducting passage, and discharging said fuel flow through a fuel outlet arranged coaxially with respect to said outer oxidant outlet and spaced radially inwardly therefrom,
    conducting an inner oxidant flow comprising at least 80% oxygen through an inner oxidant-conducting passage and discharging said inner oxidant flow through an inner oxidant outlet arranged coaxially with respect to said fuel outlet and spaced radially inwardly therefrom, said inner oxidant flow and said outer oxidant flow providing a total oxidant flow, and
    controlling via valve means a percentage of the total oxidant flow which flows through the inner-oxidant conducting passage to control a characteristic of the flame.

17. The method according to claim 16 wherein said fuel flow is mixed with said inner oxidant flow before being mixed with said outer oxidant flow.

18. The method according to claim 16 wherein no more than about 50% of the total oxidant is supplied by said inner oxidant flow.

19. The method according to claim 16 wherein said inner oxidant flow has a discharge velocity through said inner oxidant outlet of a magnitude no less than the discharge velocity of the outer oxidant flow through said outer oxidant outlet.

20. The method according to claim 19 wherein said discharge velocity of said inner oxidant flow is in the range of from about 10 to 200 m/s.

21. The method according to claim 20 wherein said fuel flow comprises a natural gas flow having a discharge velocity through said fuel outlet in the range of from 20 to 80 m/s.

22. The method according to claim 19, wherein said discharge velocity of said outer oxidant flow is in the range of 10 to 50 m/s.

23. The method according to claim 16, wherein the percentage of the total oxidant flow which flows through the inner oxidant passage is greater than the percentage of the total oxidant flow which flows through the outer oxidant passage.

24. An oxy-fuel burner comprising:
    an oxidant source comprising at least 80% oxygen;
    an outer oxidant-conducting passage forming an outer oxidant outlet in fluid communication with said oxidant source;
    an inner oxidant-conducting passage forming an inner oxidant outlet in fluid communication with said oxidant source;
    a fuel-conducting passage forming a fuel outlet;
    said outer oxidant outlet, said inner oxidant outlet, and said fuel outlet being coaxially arranged, with said fuel outlet disposed radially between said outer and inner oxidant outlets; and
    valve means for producing an oscillating flow of oxidant through the inner oxidant-conducting passage to control a characteristic of the flame.

25. A method of combining oxidant and fuel in an oxy-fuel burner to produce a flame, comprising:
    conducting an outer oxidant flow comprising at least 80% oxygen through an outer oxidant-conducting passage, and discharging said outer oxidant flow through an outer oxidant outlet;
    conducting a fuel flow through a fuel-conducting passage, and discharging said fuel flow through a fuel outlet arranged coaxially with respect to said outer oxidant outlet and spaced radially inwardly therefrom;
    conducting an inner oxidant flow comprising at least 80% oxygen through an inner oxidant-conducting passage and discharging said inner oxidant flow through an inner oxidant outlet arranged coaxially with respect to said fuel outlet and spaced radially inwardly therefrom, said inner oxidant flow and said outer oxidant flow providing a total oxidant flow;
    oscillating the oxidant flow through the inner oxidant-conducting passage by controlling a valve operatively associated with the inner oxidant-conducting passage to control a characteristic of the flame.

* * * * *